US007177858B2

(12) United States Patent
Belowsov

(10) Patent No.: US 7,177,858 B2
(45) Date of Patent: Feb. 13, 2007

(54) APPARATUS AND METHOD FOR INTERFACING WITH A METRICS DATABASE

(75) Inventor: Andre Belowsov, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 751 days.

(21) Appl. No.: 10/052,639

(22) Filed: Jan. 23, 2002

(65) Prior Publication Data

US 2003/0140036 A1 Jul. 24, 2003

(51) Int. Cl.
*G06F 17/30* (2006.01)

(52) U.S. Cl. ............................ 707/3; 709/224; 707/10; 707/101; 707/102; 707/103

(58) Field of Classification Search ................ 707/1–3, 707/10, 101–103; 705/26, 6, 27; 709/201, 709/224
See application file for complete search history.

(56) References Cited

U.S. PATENT DOCUMENTS 6,594,799 B1 * 7/2003 Robertson et al. ............. 716/1
6,836,466 B1 * 12/2004 Kant et al. .................. 370/252
6,839,751 B1 * 1/2005 Dietz et al. ................. 709/224
6,842,737 B1 * 1/2005 Stiles et al. ..................... 705/6
6,873,990 B2 * 3/2005 Oblinger ..................... 707/101
2001/0025267 A1 * 9/2001 Janiszewski ................. 705/37
2002/0002550 A1 * 1/2002 Berman .......................... 707/3
2002/0105550 A1 * 8/2002 Biebesheimer et al. ..... 345/835
2003/0126026 A1 * 7/2003 Gronberg et al. ............. 705/26
2003/0135474 A1 * 7/2003 Circenis et al. ............. 705/400

OTHER PUBLICATIONS

"Metrics Database Buider Help" http://64.233.161.104/search?q=cache:HBzLp0gCptoJ:www.engin.umd.umich.edu/CIS/tinytools/cis375/f00/metrics/help_main.htm+metrics+database&hl=en.*

* cited by examiner

*Primary Examiner*—Jeffrey Pwu
(74) *Attorney, Agent, or Firm*—Finnengan, Henderson, Farabow, Garrett & Dunner, L.L.P.

(57) ABSTRACT

An apparatus and method for interfacing with a metrics database is provided for getting metrics data and grouping metrics data in response to a query. The metrics database interface gets metrics data by retrieving a set of metrics data from the metrics database in response to a query and determining a set of unique tags. The metrics database interface also groups a set of metrics data in response to a query so that the group can be referenced in a subsequent query.

39 Claims, 8 Drawing Sheets

300

| Tag 1 | Additive Attributes |
| --- | --- |
| Tag 1 | Additive Attributes |
| . . . | . . . |
| Tag 2 | Additive Attributes |
| Tag 2 | Additive Attributes |
| . . . | . . . |
| Tag 3 | Additive Attributes |
| Tag 3 | Additive Attributes |
| . . . | . . . |
| . . . | . . . |

| Tag 1 | Totaled Attributes |
|---|---|
| Tag 2 | Totaled Attributes |
| Tag 3 | Totaled Attributes |
| . . . | . . . |

Figure 5

APPARATUS AND METHOD FOR INTERFACING WITH A METRICS DATABASE

FIELD OF THE INVENTION

The present invention relates to database interfaces and, more particularly, to a method and apparatus for interfacing with a metrics database.

BACKGROUND OF THE INVENTION

In software development, a metric is the measurement of a particular characteristic of a program's performance or efficiency. A set of metrics is generated as a result of the testing of a software product. The generated set of metrics is stored in a metrics database.

Structured query language (SQL) is a standard protocol for accessing databases. SQL includes features that allow users to query, update, insert data into, and delete data from a database. Many computer programming languages such as C, C++, and Java™ include an application program interface (API) for accessing databases using SQL protocol. For example, when a program written in the Java™ programming language developed by Sun Microsystems, Inc. requires access to a database, the program can employ the JDBC™ Application Program Interface (JDBC™ API) and its associated drivers. "JDBC" may have, at one time, been an acronym for Java™ Database Connectivity, but it is now a trademark of Sun Microsystems, Inc. Through JDBC, programs written in the Java programming language may access a database using standard SQL queries. More specifically, a Java-program can use JDBC to establish a connection with a database, send SQL statements to the database, process a result from the database and return a result to the program.

Unfortunately, SQL is inadequate for use with a metrics database because metrics are generated for each line of code. Accordingly, when a metrics database is queried by an application program, the standard SQL interface returns metrics data for each line of code. For example, if a query requests the time for execution of a program module, the time metric for each line of code is returned. However, the metrics data associated with a single line of code is generally meaningless.

SUMMARY OF THE INVENTION

In accordance with the invention, there is provided a method and apparatus for interfacing with a metrics database. The metrics database interface responds to a query requesting a set of metrics data. The metrics database interface retrieves a set of tags and any requested additive attributes associated with the tags in response to the query. The metrics database interface determines the tags that are unique and adds together the like additive attributes associated with each unique tag. The metrics database interface then calculates the derived attributes for each unique tag. The derived attributes may be calculated from the set of totaled attributes corresponding to each unique tag. In another aspect of the invention, the metrics database interface enables the grouping of metrics data so that the group can be referenced by a subsequent query.

Additional aspects of the invention will be set forth in part in the description which follows, and in part will be obvious from the description, or may be learned by practice of the invention. Aspects of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 3 depicts an example of a table returned after metrics data is retrieved from a metrics database in accordance with an embodiment of the present invention;

FIG. 5 depicts an example of a table returned after the unique tags have been determined and the like additive attributes have been added together in accordance with an embodiment of the present invention;

DETAILED DESCRIPTION

Figure 1:
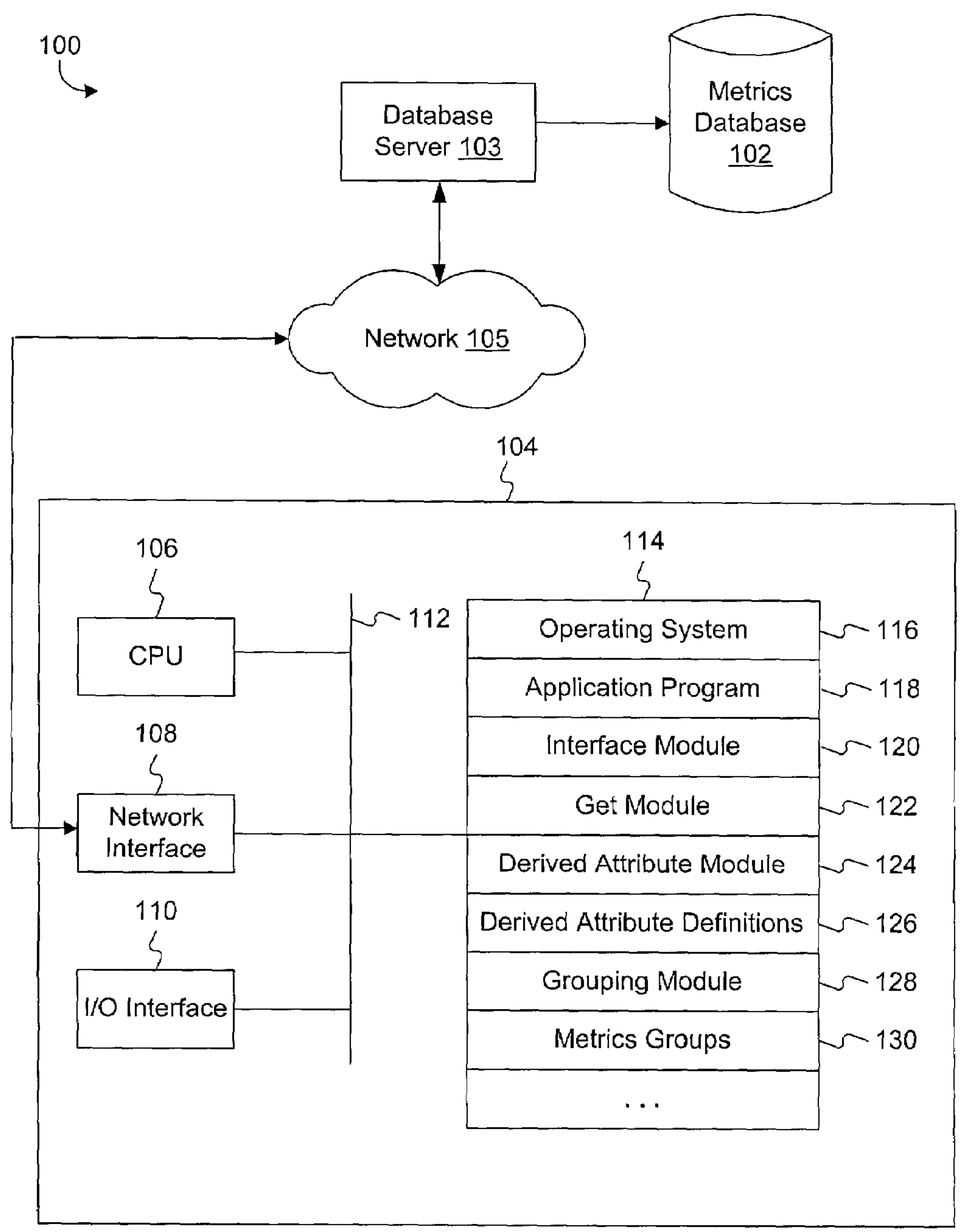
FIG. 1 depicts a block diagram of a system in accordance with an embodiment of the present invention.

Two different categories of metrics data is stored in a metrics database. The first category consists of identification attributes that label each component of a software program. For example, the entire software program has an identification attribute associated with it, each of the modules that make up the software program has an identification attribute associated with it, and each line of code has an identification attribute associated with it. Combinations of identification attributes, known as tags, are used to identify particular elements of a software program. For example, a tag identifying a particular line of code of a software program may consist of an identification attribute for the software program, an identification attribute for the software program module that contains the line of code, and an identification attribute for the line of code. The second category of metrics data in a metrics database consists of additive attributes. Additive attributes are associated with each of the tags and can be added together to form meaningful totals. For example, the time metric is an additive attribute that represents the execution time of a single line of code. To determine the total execution time for a module of a software program it is necessary to add together all of the time metrics associated with the tag that identifies the module. Because metrics are generated for each line of code, the number of time metrics associated with the module's tag is equal to the number of lines of code that make up the module.

Both identification attributes and additive attributes are stored in the metrics database. The database typically organizes data using one or more tables having multiple rows and columns. A data relationship is defined by the manner in which data is stored in the various rows and columns of the tables. Each row of a table in a metrics database contains a tag and the additive attributes associated with the tag. Each column of a metrics database contains like additive or identification attributes. For example, a column may contain all time metrics for a software program.

A category of metrics data that is not stored in the metrics database consists of derived attributes. Derived attributes are those attributes that are derived from other attributes. For example, the pass/fail rate is derived from the pass metric and the fail metric. Derived attributes are created from the metrics data stored in the metrics database based on derived attribute functions provided by a query. The derived attribute function references the attributes upon which the derived attribute function operates.

In accordance with the principles of the present invention, when a query from an application program requests a set of metrics data, a metrics database interface uses SQL statements to retrieve a set of tags and any requested additive attributes associated with the tags. The metrics database interface determines the tags that are unique and adds together the like additive attributes associated with each unique tag to form a set of totaled attributes. If the query requests derived attributes, the metrics database interface uses the appropriate derived attribute function to calculate the derived attributes from the set of totaled attributes for the each unique tag.

In addition, the metrics database interface enables the grouping of metrics data. A group query submitted by an application program defines a set of metrics data for grouping and storing. The group can then be accessed by a subsequent query.

Reference will now be made in detail to the exemplary embodiments of the invention, examples of which are illustrated in the accompanying drawings. Wherever possible, the same reference numbers will be used throughout the drawings to refer to the same or like parts.

FIG. 1 is a block diagram illustrating a system 100 in accordance with an embodiment of the present invention. The system 100 includes a metrics database 102 and a network 105 connecting a database server 103 and a database interface computer 104. Network 105 can be a combination of networks including the Internet, corporate intranets, and other networks compatible with a networking protocol such as TCP/IP. Metrics database 102 includes database tables containing metrics data associated with a test of a software product.

Database interface computer 104 includes a central processing unit 106, a network interface 108, I/O interface 110, and a memory 114. CPU 106 executes instructions associated with applications contained in memory 114 and transmits results to other subsystems in database interface computer 104 over a high speed interconnect or bus 112. I/O interface 110 is an interface used to couple database interface computer 104 with devices such as a keyboard, a mouse, a display device, and any other I/O device useful in operating and managing database interface computer 104 as is understood by one of skill in the art. The network interface 108 is used to communicate with network 105.

Figure 6:
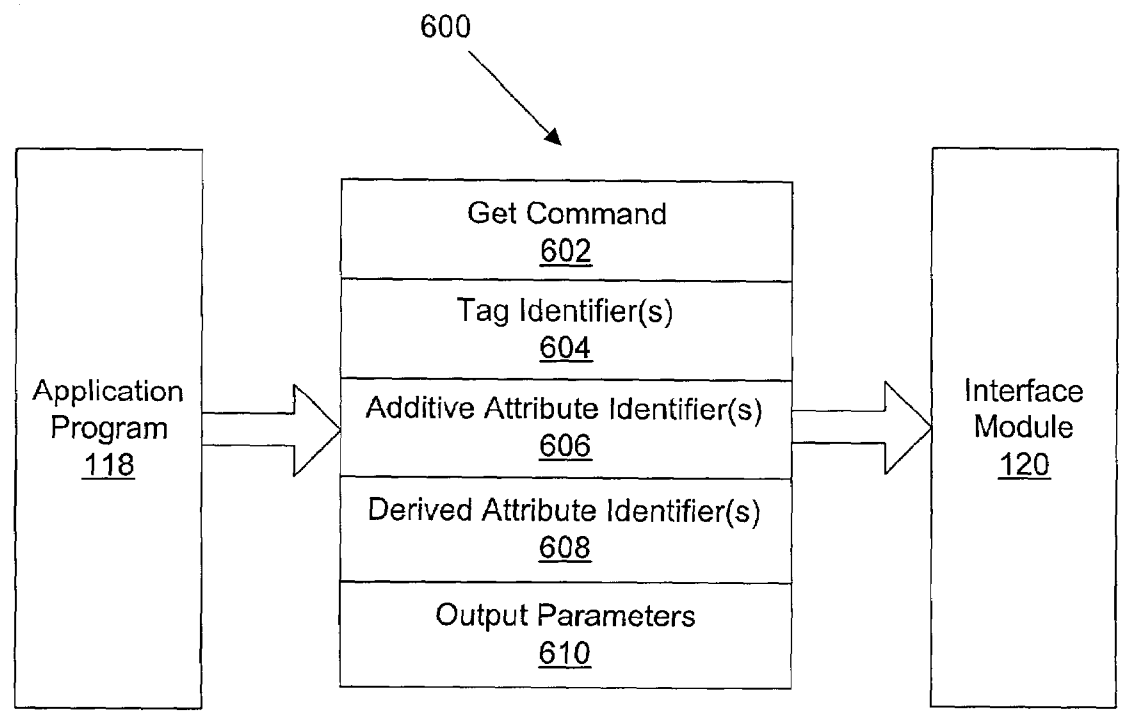
FIG. 6 depicts a diagram of a query requesting to get a set of metrics data in accordance with an embodiment of the present invention.

Memory 114, in one embodiment, includes: an operating system 116 for managing operations of computer 104; an application program 118 having program instructions that when executed communicate information to and from a user; an interface module 120 having program instructions that when executed receive queries from the application program 118 and return metrics data to the application program 118; a get module 122 having program instructions that when executed get metrics data requested in a query (as described below with reference to the flow diagram of FIG. 2); a derived attribute module 124 having program instructions that when executed store derived attribute definitions 126; and a grouping module 128 having program instructions that when executed group metrics data and store it as metrics groups 130 (as described below with reference to the flow diagram of FIG. 6).

Figure 2:
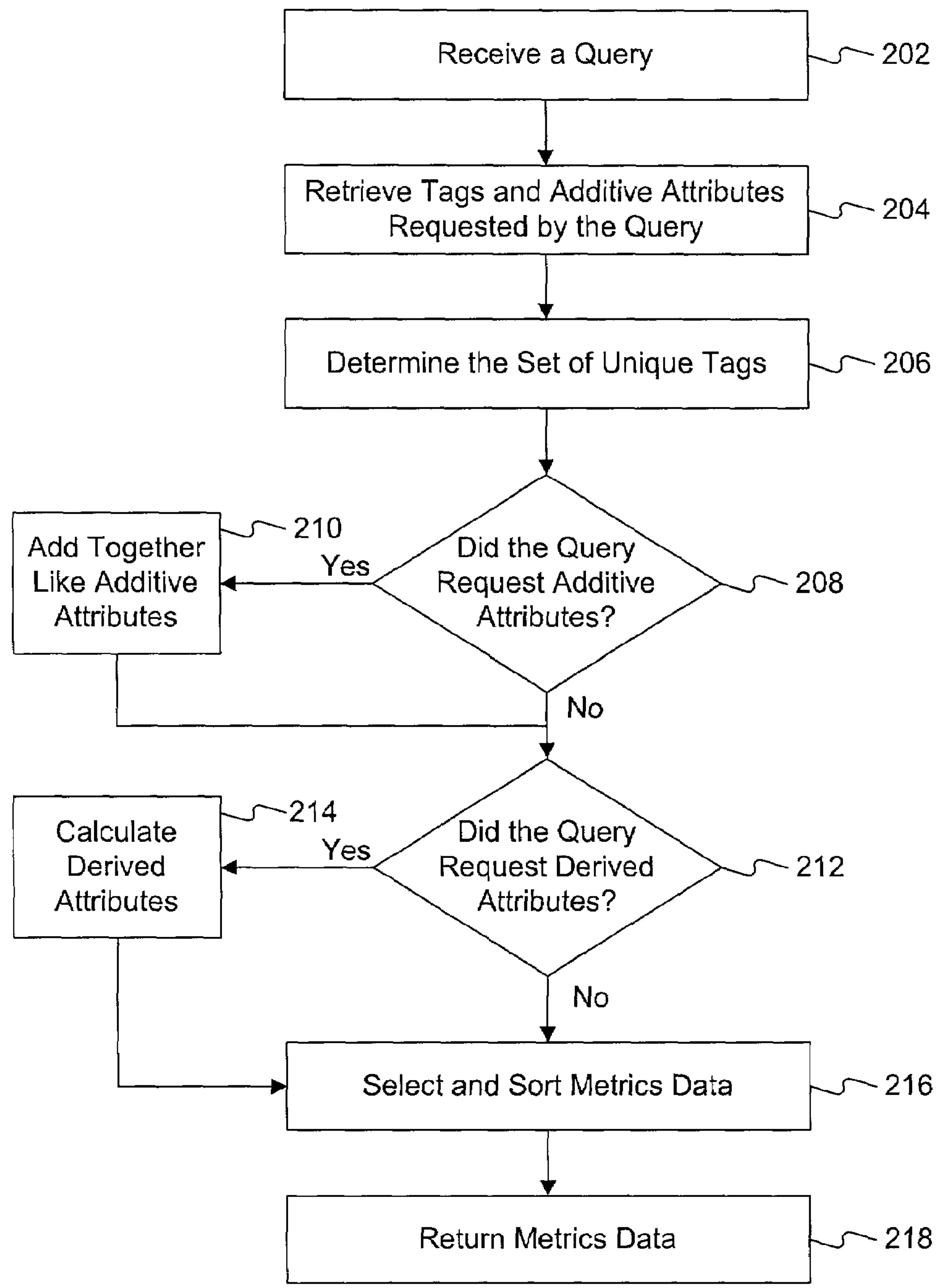
FIG. 2 depicts a flow diagram of a process for accessing metrics data in accordance with an embodiment of the present invention.

FIG. 2 depicts a flow diagram for accessing metrics data in accordance with an embodiment of the present invention. First, in step 202, the interface module 120 receives a query containing a request to get a set of metrics data. The query includes a command for getting metrics data and identifies a set of requested tags. In addition, the query may identify a set of additive attributes, a set of derived attributes, and a set of output parameters. The query is submitted from an application program 118 which is typically written in a programming language such as C, C++ or Java. The application program 118 formulates the query based on information provided by a user. In one embodiment, the application program 118 is a server application that communicates with a client computer (not shown) over network 105 through the network interface 108. In another embodiment, the application program 118 is a graphical user interface that receives information directly from a user through the I/O interface 110 from a user input device (not shown) such as a keyboard.

Upon reading the command for getting metrics data, the interface module 120 initiates the get module 122. In step 204 of FIG. 2, the get module 122 retrieves tags responsive to the query. Also, if the query requested additive attributes, the get module 122 retrieves the requested additive attributes associated with the tags. In order to access the metrics database, the get module employs a database language such as SQL. In one embodiment, the get module 122 sends SQL statements to the database server 103 requesting the tags and additive attributes identified in the query. The database server 103 returns a table containing the requested tags along with the associated additive attributes. Table 300 of FIG. 3 is an example of an embodiment of a configuration of a table returned from server 103. As shown in table 300, because metrics data is returned for each line of code, the tags returned are repetitive. For example, a query may request the time metric for a software program X. The initial fetch returns a table containing the time metric for each line of software program X along with, for each line, the tag that identifies software program X. Thus, FIG. 3 depicts a table 300 containing different sets of tags (tag 1, tag 2, etc.) along with the associated additive attributes for each line of code.

Figure 4:
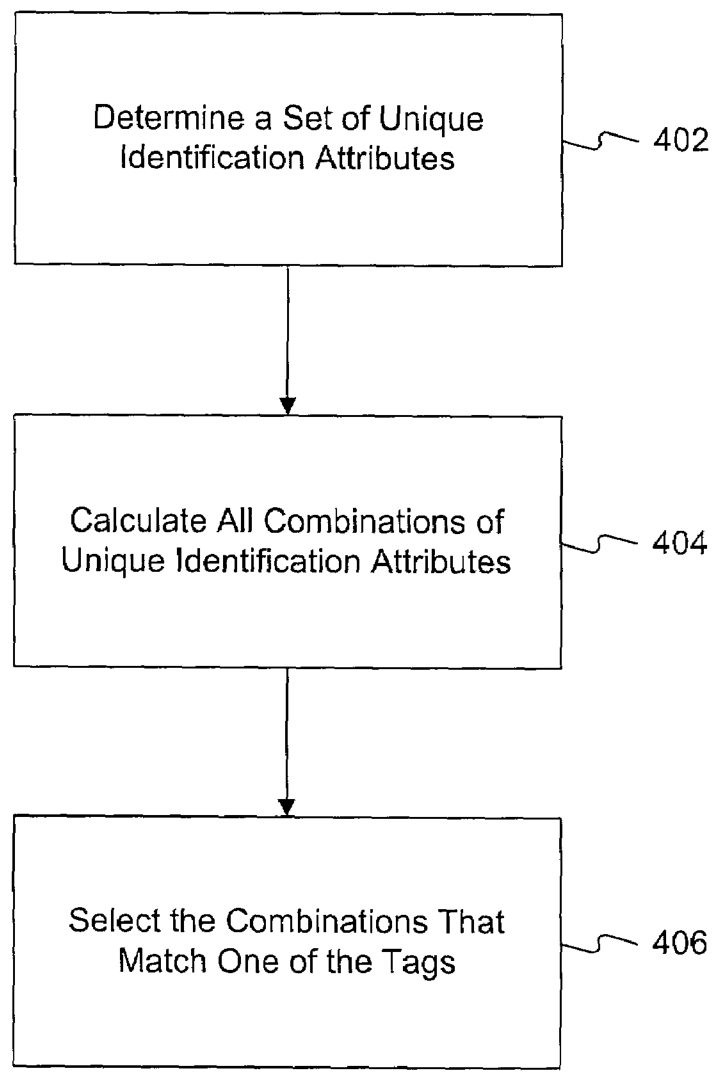
FIG. 4 depicts a flow diagram for determining the unique tags in accordance with an embodiment of the present invention.

Returning to FIG. 2, after the initial fetch, the get module 122 (FIG. 1) determines (step 206) the set of tags that is unique. FIG. 4 depicts a flow diagram for determining the unique tags in accordance with an embodiment of the present invention. The get module 122 first determines (step 402) a set of unique identification attributes from the set of identification attributes that make up the tags returned from the initial fetch. Typically, the unique identification attributes are determined by comparing each identification attribute to the other identification attributes and eliminating the identification attributes that are matched. The get module 122 then determines (step 404) possible combinations of the unique identification attributes. The get module 122 compares these combinations to the set of tags that were actually returned, and selects the combinations that were matched (step 406). For example, an initial fetch may return tags for modules A and B of program X, and modules C and D of program Y. The unique identification attributes that make up these tags are for program X, program Y, module A, module B, module C, and module D. The get module 122 determines possible combinations of the identification attributes: program X and module A, program X and module B, program X and module C, program X and module D, program Y and module A, program Y and module B, program Y and module C, and program Y and module D. The get module 122 then compares each of the combinations to the set of tags that were returned and selects the combinations that were matched. Thus, the combinations for program X and module A, program X and module B, program Y and module C, and program Y and module D are selected.

Returning to FIG. 2, if the query requested additive attributes (step 208), the get module 122 adds (step 210) together the like additive attributes associated with each unique tag. The get module 122 selects the additive attributes associated with each unique tag and adds together the like additive attributes. The result of this process is a table containing each unique tag along with a set of totaled attributes associated with each unique tag. For example, a query received from an application program may request the pass metric and the fail metric for software program X. The get module 122 adds together the pass metrics associated with software program X and the fail metrics associated with software program X. After this process is completed, the resulting table contains only a single entry for the tag identifying software program X along with an entry for the totaled pass metric associated with software program X and the totaled fail metric associated with software program X. FIG. 5 shows an embodiment of the table 500 returned after the get module 122 selects the unique tags from table 300 of FIG. 3 and totals the like additive attributes associated with each unique tag. The table 500 consists of only the unique tags (tag 1, tag 2, etc.) along with the totaled attributes associated with each unique tag.

Returning to FIG. 2, if the query requested derived attributes (step the get module 122 calculates (step 214) the derived attributes. The derived attributes may be derived from the sets of totaled attributes, the set of unique tags, or both. The derived attribute must first be defined in a prior query before it can be requested. A query defining a derived attribute includes a derived attribute definition command and a derived attribute definition. Upon reading the derived attribute definition command, the interface module 120 initiates a derived attribute module 124 to store the derived attribute definition with the derived attribute definitions 126. A derived attribute definition includes an identifier for the derived attribute and a derived attribute function. When a query requests the derived attribute, the get module 122 selects the appropriate derived attribute definition 126. The get module 122 calculates the requested derived attributes using the derived attribute function. The derived attribute function may calculate the derived attributes using the set of totaled attributes, the set of unique tags, or both. For example, if a query requested the pass/fail rate for a software program, the get module 122 calls the derived attribute definition for the pass/fail rate and calculates the derived attributes using the pass/fail rate function contained in the definition. In calculating the derived attributes, the get module 122 divides the totaled pass metric for the software program by the totaled fail metric for the software program. Thus, for each unique tag, the get module 122 generates a set of derived attributes. The derived attributes are included in the table containing the set of unique tags and the sets of totaled attributes.

In step 216 of FIG. 2, the get module 122 selects and sorts an output set of metrics data. The output set is selected from the table containing the set of unique tags, the set of totaled attributes, and the set of derived attributes. If the query does not contain output parameters having instructions for selecting the output set, the get module 122 selects the entire table containing the unique tags, the totaled attributes, and the derived attributes as the output set. Alternatively, the get module 122 selects the output set according to output parameters identified in the query.

In one embodiment, the output parameter specifically identifies a range of metrics data. For example, query requesting software modules having pass/fail rates within a certain range may include an output parameter specifically identifying a set of pass/fail rates. The get module 122 selects those software modules having the specified pass/fail rates. Alternatively, the output parameter contains a function and the output module tests the metrics data for applicability using the function. For example, the query requesting software modules having pass/fail rates within a certain range may provide a range function with an upper bound and a lower bound. The get module 122 uses the range function to test each pass/fail metric in order to determine its applicability and those software modules with pass/fail rates within the range are selected. In addition to selecting the output set of metrics data, the get module 122 sorts the output set. In one embodiment, the output parameters include 'sort' clauses which provide instructions on sorting the output set. For example, the get module 122 may sort the output set of metrics data by the module execution time from longest to shortest. If the output parameters do not include instructions for sorting the metrics data, the output set is typically sorted by default in lexicographic order. After selecting and sorting the output set, the interface module 120 returns the output set of metrics data to the application program 118 (step 218). The application program 118, in one embodiment, performs further calculations using the metrics data returned by the interface module 120. For example, the application program 118 may combine the code coverage metrics from different software modules.

FIG. 6 depicts a diagram of a query requesting to get a set of metrics data in accordance with an embodiment of the present invention. The query consists of a get command 602 and a set of tag identifiers 604. In some embodiments, the query includes a set of additive attribute identifiers 606, a set of derived attribute identifiers 608, and a set of output parameters 610. The query is sent from the application program 118 to the interface module 120. When the interface module 118 reads the get command 602, the interface module initiates the get module 122. The tag identifiers 604 identify the tags that the get module 122 must retrieve from the metrics database. The additive attribute identifiers 606 identify the additive attributes that the get module 122 must retrieve from the metrics database. The derived attribute identifiers 608 identify the derived attribute definitions that the get module 122 must use to calculate the derived attributes. Finally, the output parameters 610, in an embodiment, provide the get module with instructions to select and sort the output set of metrics data. The output parameters typically include a set of 'where' clauses that provide instructions for selecting the output set and a set of 'sort' clauses that provide instructions for sorting the output set of metrics data.

Figure 7:
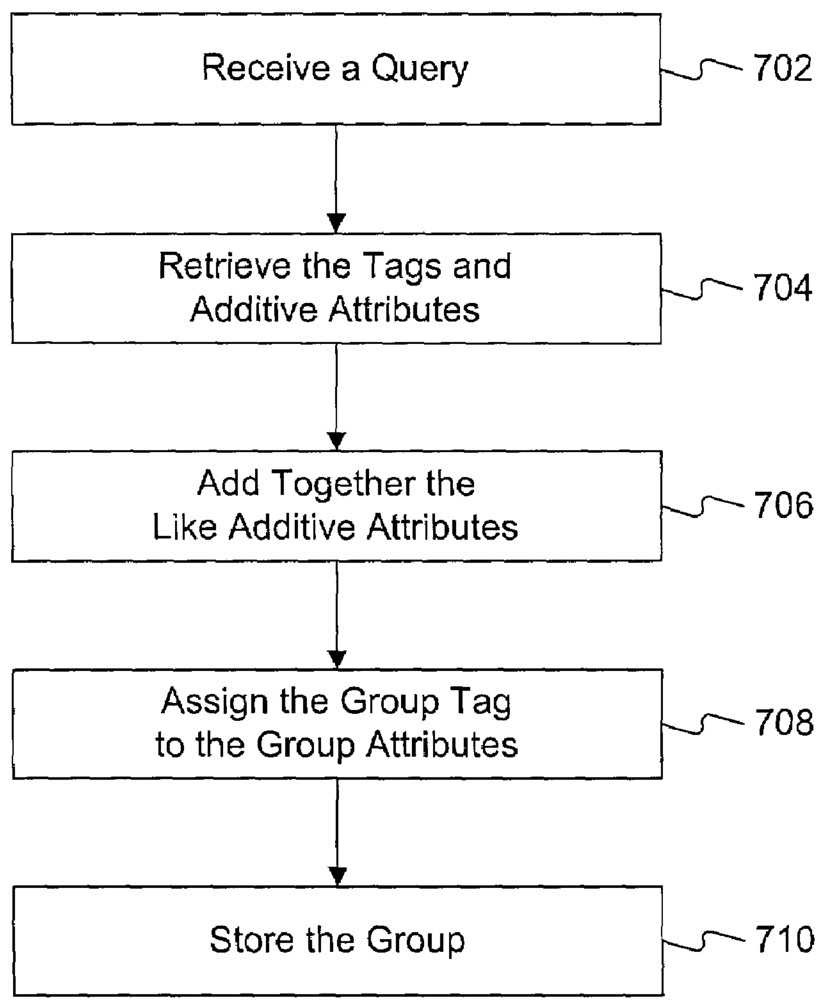
FIG. 7 depicts a flow diagram for grouping a set of metrics data in accordance with an embodiment of the present invention.

It may be useful to define a group of metrics data so that a query requesting metrics data can refer to the group, rather than listing each tag individually. Turning to FIG. 7, in one embodiment, the interface module 120 receives (Step 702) a query which includes a command for grouping a set of metrics data, identifies a set of tags for grouping together, and provides a group tag. In step 704, upon reading the command for grouping the set of metrics data, the interface module 120 initiates the grouping module 128 to retrieve the set of tags along with all associated additive attributes from the metrics database 102. In one embodiment, the grouping module 128 sends SQL statements to the database server 103 in order to retrieve the set of tags and additive attributes. The grouping module 128 adds (step 706) together the like additive attributes associated with the tags to produce a set of group attributes. The grouping module 128 then assigns (step 708) the group tag to the set of group attributes and stores (step 710) the group tag along with the set of group attributes as a metrics group 130.

Once the group tag is assigned to the group attributes and the metrics group is stored, a subsequent query to get metrics data can include a group tag identifier along with any other tag identifier. Accordingly, upon a request to get a metrics group, the get module 122 retrieves the group tag and any requested group attributes from the stored metric groups 130. The derived attributes are calculated from the group attributes. Once a group is defined, it may be referenced by subsequent queries and used in the definition of other groups.

Figure 8:
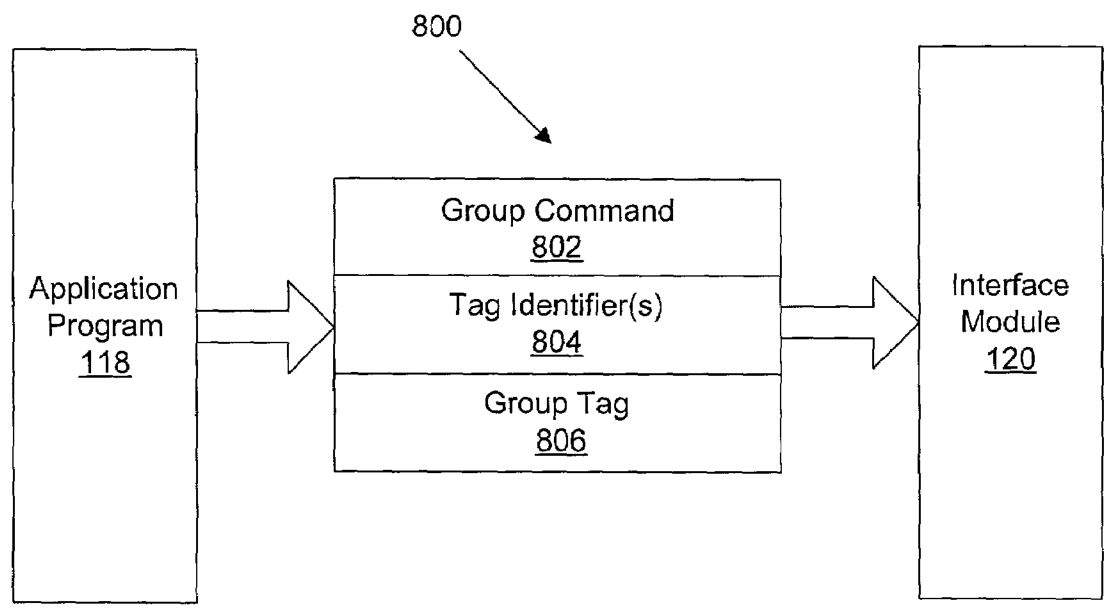
FIG. 8 depicts a diagram of a query requesting to group a set of metrics data in accordance with an embodiment of the present invention.

FIG. 8 depicts a diagram of a query for grouping metrics data in accordance with an embodiment of the present invention. The query 800 consists of a group command 802, a set of tag identifiers 804 and a group tag 806. The query is sent from the application program 118 to the interface module 120. When the interface module 120 receives the query 800, the interface module 120 initiates the grouping module 128. The grouping module 128 retrieves the tags identified by the tag identifiers 804 along with all of the additive attributes associated with the tags. After adding together the like additive attributes, the grouping module 128 assigns the group tag 805 and stores the group.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of accessing metrics data comprising:

providing a metrics database comprising metrics data that describes characteristics of a software product;

receiving a query;

retrieving from the metrics database a set of tags; and determining a subset of unique tags from the set of tags based on a set of parameters included in the query.

2. The method of claim 1 wherein determining a subset of unique tags comprises:

determining a set of unique identification attributes from the set of tags;

calculating a set of combinations from the set of unique identification attributes; and selecting a subset of the set of combinations wherein each one of the subset of combinations matches one of the set of tags.

3. The method of claim 1 wherein retrieving comprises retrieving, from the metrics database, a set of additive attributes associated with each one of the set of tags.

4. The method of claim 3 further comprising combining like additive attributes from the set of additive attributes associated with each one of the subset of unique tags to provide a set of totaled attributes for the one unique tag.

5. The method of claim 4 further comprising selecting an output set of data from the subset of unique tags and the set of totaled attributes in accordance with the set of parameters included in the query.

6. The method of claim 5 further comprising sorting the output set in accordance with the set of parameters.

7. The method of claim 4 further comprising calculating a set of derived attributes from the set of totaled attributes for the one unique tag.

8. The method of claim 7 wherein the derived attributes are calculated using a derived attribute definition received in a prior query.

9. The method of claim 7 further comprising selecting an output set of data from the subset of unique tags, the set of totaled attributes, and the set of derived attributes in accordance with the set of parameters included in the query.

10. The method of claim 9 further comprising sorting the output set in accordance with the set of parameters.

11. A method of grouping metrics data in a metrics database comprising:

providing a metrics database comprising metrics data that describes characteristics of a software product;

receiving a query;

retrieving from the metrics database a set of tags and a set of additive attributes associated with the set of tags;

combining like additive attributes from the set of additive attributes to produce a set of group attributes; and assigning a group tag to the set of group attributes.

12. A memory for storing data configured for processing by an interface module being executed on a computer system, comprising:

a set of tag identifiers; and a command for accessing a set of metrics data wherein, upon reading the command, the interface module initiates a get module to retrieve from a metrics database a set of tags corresponding to the set of tag identifiers and to determine a subset of unique tags from the set of tags based on a set of parameters included in the command.

13. The memory of claim 12 further comprising a set of additive attribute identifiers associated with each one of the set of tags, wherein the get module retrieves a set of additive attributes corresponding to the set of additive attribute identifiers and combines like additive attributes from the set of additive attributes associated with each one of the subset of unique tags to provide a set of totaled attributes for the one unique tag.

14. The memory of claim 13 further comprising a set of derived attribute identifiers, wherein the get module calculates a set of derived attributes from the set of totaled attributes based on a set of derived attribute definitions associated with the set of derived attribute identifiers.

15. The memory of claim 13, wherein the get module selects an output set of the set of tags and the set of additive attributes in accordance with the set of parameters.

16. The memory of claim 14, wherein the get module selects an output set of the set of tags, the set of additive attributes, and the set of derived attributes in accordance with the set of parameters.

17. A memory for storing data configured for processing by an interface module being executed on a computer system, comprising:

a group tag;

a set of tag identifiers; and a command for grouping a set of metrics data wherein, upon reading the command, the interface module initiates a grouping module for:

retrieving a set of tags corresponding to the set of tag identifier;

retrieving a set of additive attributes associated with the set of tags;

combining like additive attributes from the set of additive attributes to produce a set of group attributes, and assigning the group tag to the set of group attributes.

18. A system for interfacing with a metrics database comprising:

a central processing unit; and an interface module configured for execution by the central processing unit, the interface module comprising instructions for:

receiving a query from an application program;

initiating a get module in response to the query, the get module comprising instructions for:

retrieving from the metrics database a set of tags; and determining a subset of unique tags from the set of unique tags based on a set of parameters included in the query.

19. The system of claim 18 wherein the get module further comprises instructions for:

determining a set of unique identification attributes from the set of tags;

calculating a set of combinations from the set of unique identification attributes; and selecting a subset of the set of combinations wherein each one of the subset of combinations matches a one of the set of tags.

20. The system of claim 18 wherein the get module further comprises instructions for retrieving from the metrics database a set of additive attributes associated with each one of the set of tags.

21. The system of claim 20 wherein the get module further comprises instructions for combining like additive attributes from the set of additive attributes associated with each one of the subset of unique tags to provide a set of totaled attributes for the one unique tag.

22. The system of claim 21 wherein the get module further comprises instructions for selecting an output set of metrics data from the subset of unique tags and the set of totaled attributes in accordance with the set of parameters included in the query.

23. The system of claim 22 wherein the get module further comprises instructions for sorting the output set in accordance with the set of parameters.

24. The system of claim 21 wherein the get module further comprises instructions for calculating a set of derived attributes from the set of totaled attributes for the one unique tag.

25. The system of claim 24 wherein the get module further comprises instructions for calculating the set of derived attributes using a derived attribute definition.

26. The system of claim 24 wherein the get module further comprises instructions for selecting an output set of data from the subset of unique tags, the set of totaled attributes and the set of derived attributes in accordance with the set of parameters included in the query.

27. The system of claim 26 wherein the get module further comprises instructions for sorting the output set in accordance with the set of parameters.

28. A system for interfacing with a metrics database comprising:

a central processing unit; and an interface module, configured for execution by the central processing unit, the interface module comprising instructions for:

receiving a query from an application program; and initiating a grouping module in response to the query, the grouping module comprising instructions for:

retrieving from the metrics database a set of tags and a set of additive attributes associated with the set of tags in response to the query;

combining like additive attributes from the set of additive attributes to produce a set of group attributes; and assigning a group tag to the set of group attributes.

29. A computer program product for use in conjunction with a computer system, the computer program product comprising a computer readable storage medium and a computer program mechanism embedded therein, the computer program mechanism comprising:

an interface module comprising instructions for receiving a query; and a get module comprising instructions for:

retrieving from a metrics database a set of tags; and determining a subset of unique tags from the set of tags based on a set of parameters included in the query.

30. The computer program mechanism of claim 29 wherein the get module further comprises instructions for:

determining a set of unique identification attributes from the set of tags;

calculating a set of combinations from the set of unique identification attributes; and selecting a subset of the set of combinations wherein each one of the subset of combinations matches a one of the set of tags.

31. The computer program mechanism of claim 29 wherein the get module further comprises instructions for retrieving a set of additive attributes associated with each one of the set of tags.

32. The computer program mechanism of claim 31 wherein the get module further comprises instructions for combining like additive attributes from the set of additive attributes associated with each one of the subset of unique tags to provide a set of totaled attributes for the one unique tag.

33. The computer program mechanism of claim 32 wherein the get module further comprises instructions for selecting an output set of data from the subset of unique tags and the set of totaled attributes in accordance with the set of parameters included in the query.

34. The computer program mechanism of claim 33 wherein the get module further comprises instructions for sorting the output set in accordance with the set of parameters.

35. The computer program mechanism of claim 32 wherein the get module further comprises instructions for calculating a set of derived attributes from the set of totaled attributes for the one unique tag.

36. The computer program mechanism of claim 35 wherein the get module further comprises instructions for calculating the derived attributes using a derived attribute definition.

37. The computer program mechanism of claim 35 wherein the get module further comprises instructions for selecting an output set of data from the subset of unique tags, the set of totaled attributes, and the set of derived attributes in accordance with the set of parameters included in the query.

38. The computer program mechanism of claim 37 wherein the get module further comprises instructions for sorting the output set in accordance with the set of parameters.

39. A computer program product for use in conjunction with a computer system, the computer program product comprising a computer readable storage medium and a computer program mechanism embedded therein, the computer program mechanism comprising:

an interface module comprising instructions for receiving a query;

a grouping module comprising instructions for:

retrieving from a metrics database a set of tags and a set of additive attributes associated with the set of tags in response to a query;

adding together like additive attributes from the set of additive attributes to produce a set of group attributes; and assigning a group tag to the set of group attributes.

* * * * *

UNITED STATES PATENT AND TRADEMARK OFFICE
CERTIFICATE OF CORRECTION

PATENT NO. : 7,177,858 B2
APPLICATION NO. : 10/052639
DATED : February 13, 2007
INVENTOR(S) : Andre Belowsov It is certified that error appears in the above-identified patent and that said Letters Patent is hereby corrected as shown below:

On the title page, item (74), line 1, second col. "Finnengan," should read --Finnegan,--.

Signed and Sealed this

Tenth Day of April, 2007

JON W. DUDAS
*Director of the United States Patent and Trademark Office*